Patented Aug. 26, 1924.

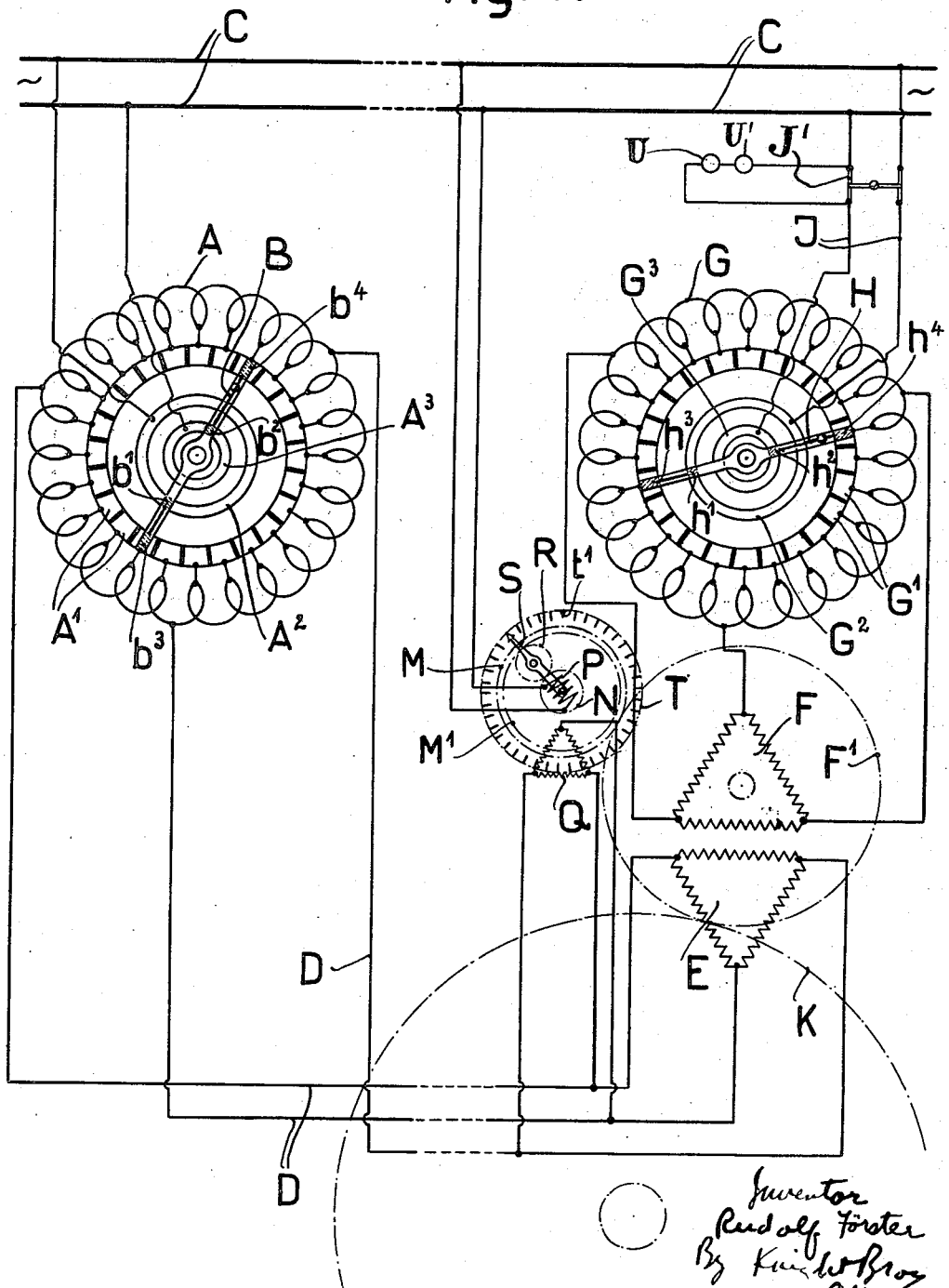

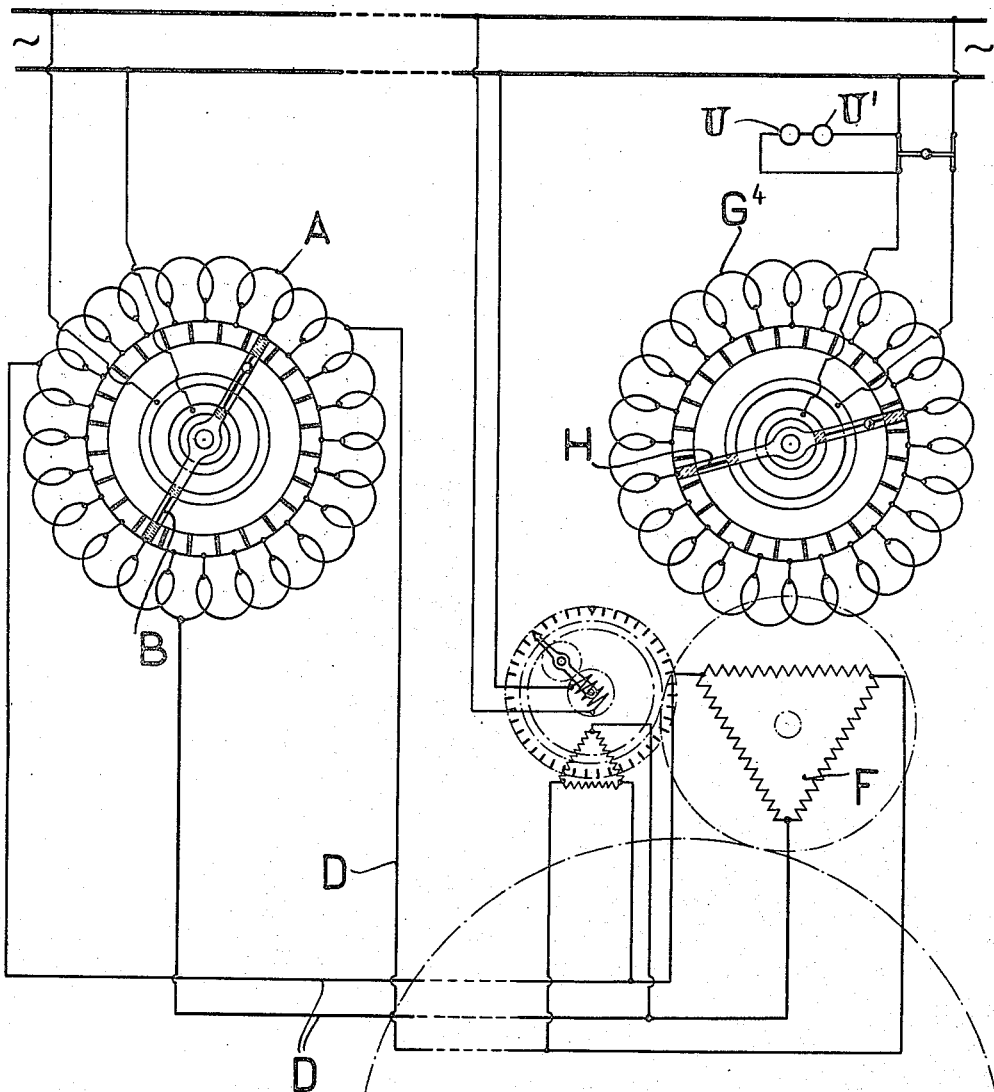

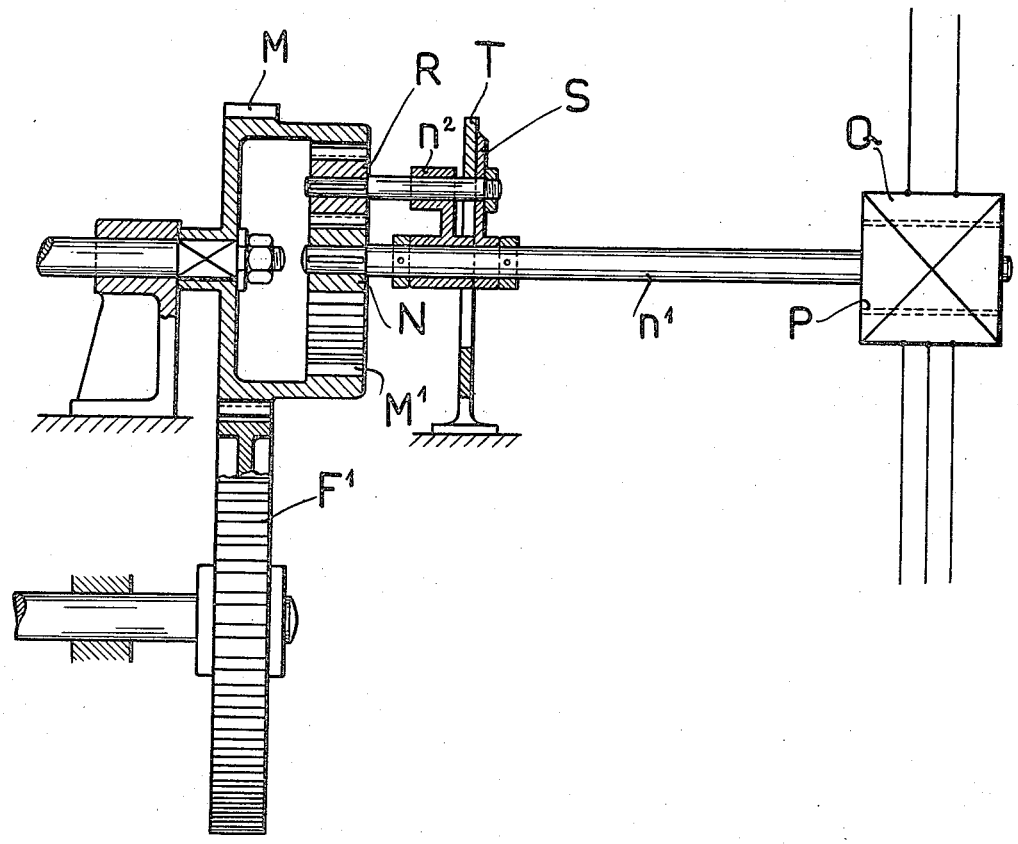

1,506,625

UNITED STATES PATENT OFFICE.

RUDOLF FÖRSTER, OF ESSEN, GERMANY, ASSIGNOR TO FRIED. KRUPP AKTIEN-GESELLSCHAFT, OF ESSEN-ON-THE-RUHR, GERMANY.

ELECTRIC LONG-DISTANCE CONTROL.

Application filed September 7, 1920. Serial No. 408,741.

*To all whom it may concern:*

Be it known that I, RUDOLF FÖRSTER, residing at Essen, Germany, a citizen of the German Republic, have invented a certain new and useful Improvement in Electric Long-Distance Control (for which I have filed an application in Germany July 26, 1916, No. K62,708), of which the following is a specification.

This invention relates to apparatus for the transmission of rotary movements of a transmitter to a receiver acting synchronously therewith. The object of the invention is to perfect such apparatus so, that the receiver is capable of making an adjustment corresponding to the adjustment of the transmitter either as usual simultaneously or only after the lapse of any desired period of time. Such is the case for example when the object to be controlled and positively connected to the receiver, say the carriage of a gun, must remain at rest during the adjustment of the transmitter for some reason, such for example as the loading of the gun barrel, and is only to be subsequently adjusted to correspond to the adjustment which the transmitter then possesses.

The invention is specially important in such cases where the tranmitter, the rotary part of which may be coupled to a sighting device for example, is kept in constant motion, as is frequently the case when controlling the traversing gear of guns from a distance.

According to this invention the said purpose is attained by connecting to a main transmitter a main and auxiliary receiver with an indicating apparatus which gives the angular adjustment of the two receiver rotors and by connecting the rotor or stator winding of the main receiver to an auxiliary transmitter connected to the source of current which supplies the main transmitter and providing a switch by means of which the auxiliary transmitter can be switched off therefrom.

The main use which the inventor makes of this arrangement is the following: When, for instance, a gun carriage geared to the main receiver rotor is to be adjusted horizontally from a distance, after the gun barrel has been loaded, the main transmitter is angularly moved and the gun carriage will then follow this movement, at once and thus may be adjusted. The pointer of the indicating apparatus is moved by a sun and planet gear of which one concentric wheel is suitably connected to the main receiver rotor and whose other concentric wheel is connected to the rotor of the auxiliary receiver. By this arrangement the inventor obtains the effect, that if the main and auxiliary rotors move synchronously, the pointer will remain in the zero position, whereas if, for some reason or other—when, for instance, the auxiliary transmitter has been disconnected from the source of current for the purpose of stopping the gun carriage and loading the barrel—the main receiver rotor should not assume at once the exact angular position corresponding to the position of the transmitter, the pointer will deviate from zero. In this case the operator at the receiving station, by closing a switch and moving the auxiliary transmitter causes the pointer to go back to zero. When this has occurred the operator is sure that the gun carriage has assumed the exact angular position to which the main transmitter has been adjusted.

The invention will be further described with reference to the accompanying drawings which show two embodiments of the invention.

Figure 1 is a complete diagrammatic representation of the long distance control apparatus representing the first embodiment and showing the stator of the main receiver electrically connected to the main transmitter and its rotor electrically connected to the auxiliary transmitter.

Fig. 2 shows a diagrammatically complete representation of the second embodiment, the rotor of the main receiver being electrically connected to the main transmitter and the stator of the main receiver being merged with the auxiliary transmitter.

Fig. 3 is a section through a gearing which is common to both embodiments and connects the main receiver and auxiliary receiver to the apparatus for indicating from a distance.

A denotes the single winding arranged on the stationary part of a main transmitter constructed after the manner of a two-pole rotary field transmitter supplied with an alternating current, $A^1$ the commutator of the main transmitter and B its adjustable part, which is formed by a rotary brush holder provided with two pairs of brushes $b^1$, $b^2$ and $b^3$, $b^4$ respectively and is connected or geared to a sighting telescope (not shown). The brushes $b^1$, $b^2$ bear upon two slip rings $A^2$ and $A^3$, which are electrically connected to a source of alternating current. The other pair of brushes $b^3$, $b^4$ bears upon the commutator $A^1$. The brushes $b^1$ and $b^3$ and $b^2$ and $b^4$ respectively are electrically connected with each other in pairs only. By means of three conductors D, which are attached to points uniformly distributed over the periphery of the winding A, the main transmitter A B is connected to the three phase wound stator E of the corresponding receiver. The rotor F (which is also three phase wound) of the receiver is electrically connected (in exactly the same way as the stator E is to the transmitter winding A) to the stationary winding G of an auxiliary transmitter arranged at the receiving station, and the construction of which in all its important parts is the same as that of the above described main transmitter A B. The auxiliary transmitter contains like the main instrument a commutator $G^1$, two slip rings $G^2$ and $G^3$ and a rotary brush holder H provided with sliding brushes $h^1$, $h^2$ and $h^3$, $h^4$ respectively. The slip rings $G^2$ $G^3$ may, for the purpose of supplying the auxiliary transmitter G H be connected by conductors J across a cut out $J^1$ with the same source of alternating current C which also serves to supply the main transmitter A B.

The transmission of the rotary movements of the receiver rotor F to the part to be adjusted, e. g. the carriage (not shown) of a gun, is effected through spur wheels $F^1$ and K, of which one, $F^1$, is rigidly connected to the rotor F, and the other, K, to the gun carriage. The spur wheel $F^1$ also gears into a spur wheel M (see Figures 1 and 3) which is integral with an internally toothed wheel $M^1$ which forms a part of a planetary gearing. The internally toothed wheel $M^1$ (Figure 3) forms one concentric wheel of this gearing, the other concentric wheel of which N, is keyed fast on a shaft $n^1$ which is driven by the rotor P of an auxiliary receiver P Q. The planet wheel R, rotator on a stud $r$ which is mounted on a member $n^2$ rotatable on the shaft $n^1$, and wheel R gears into the toothed wheels $M^1$ and N. To stud $r$ is connected a pointer S loosely centered on the shaft $n^1$ so that it can rotate with the stud $r$ round the shaft $n^1$ over a stationary dial T provided with graduations the zero point of which is fixed by a mark $t^1$. The rotor P of the auxiliary receiver is connected to the source of alternating current and the stator Q to the conductors D leading from the main transmitter A B. The auxiliary receiver P Q is therefore compelled to rotate synchronously with the brush holder B simultaneously and through the same electrical angle as the brush holder. When the concentric wheel $M^1$ is stationary, the rotation of the rotor P of the auxiliary receiver causes through its concentric wheel N the planet wheel R to rotate, by rolling it round the concentric wheel $M^1$ and thus causes the pointer S of the distance indicating apparatus S T to rotate about the axis of the shaft $n^1$.

Prior to its being used, the various parts of the above described apparatus must be brought into such a position relatively to each other that the pointer S of the distance indicating apparatus S T registers with the zero mark $t^1$ on the disc T and so that the angular positions of the sighting telescope positively interlinked with the brush holder B, the gear wheel K geared to the rotor F of the main receiver and the rotor P of the auxiliary receiver are in complete agreement. When a pointing movement is to be transmitted to the gun carriage which is positively connected to the rotor K of the receiver, the brush holder B of the main transmitter is rotated out of its original position through the angle which corresponds to the angle of traverse which is to be imparted to the gun. This may be done for example by directing upon the target the sighting telescope which is positively meshed with the brush holder B. The rotation of the brush holder B is transmitted by means of the conductors D to the receiver rotors F and P in such a way that they both execute the adjustment imparted to the brush holder B and synchronously therewith. Since the gun carriage is positively connected to the rotor F of the main receiver, it has imparted to it in this operation the adjustment which corresponds to the adjustment of the brush holder B. Since also the rotor F of the main transmitter is positively connected by the gearing $F^1$ M to the one concentric wheel $M^1$ and the auxiliary receiver rotor P to the other concentric wheel N of the planetary gear $M^1$ N R, each of the concentric wheels $M^1$, N also rotates through an angle which is proportional to the angular adjustment of the brush holder B. The ratio of transmission of the toothed wheel gearing provided for the driving of the concentric wheel $M^1$ is so chosen, considering the number of poles of the receivers E F and P Q that the planet wheel R, when the concentric wheels $M^1$ N simultaneously rotate as stated, does not travel round shaft $n^1$ and thus the stud $r$ does not change its position in the space. In the adjustment of the gun carriage thus described the pointer S consequently remains stationary over the mark $t^1$.

If on the other hand the gun carriage which is positively geared to the rotor F of the main receiver is to remain at rest while the brush holder B is being adjusted, the cut out $J^1$ is opened and the auxiliary transmitter G H switched off from the source of alternating current. If now the brush holder B of the main transmitter A B be rotated through any desired angle and then locked again, the rotor F of the main receiver E F and with it also the gun carriage positively geared thereto remains at rest, as the field excited by a current derived from the source C in the rotor F disappears on the opening of the cut out $J^1$. On the other hand the rotor P of the auxiliary receiver synchronously follows the rotation of the brush holder B, as its rotor field is permanently connected to the source of alternating current C. The movements of the rotor P of the auxiliary receiver are transmitted through the gearing $n^1$ N R (see Figure 3) to the pointer S, which since the spur wheel M and the other concentric wheel $M^1$ remain stationary, rotates also through an angle which is proportional to the angle of rotation of the brush holder B, and stops in the new angular position of brush holder B.

If now the receiver rotor F and with it the gun carriage which is positively geared thereto is to be adjusted after the lapse of any desired period of time corresponding to the angular position imparted to the brush holder B of the main transmitter and the sighting telescope, the switch $J^1$ is closed again. By the closing of the switch $J^1$ the field which is excited by means of the auxiliary transmitter G H is restored in the rotor F. Under the mutual action of this field and of the field produced in the rotor F the latter begins to rotate for a fractional part of a pole division of the receiver E F and in such a way that its position tends to correspond to the position of the brush holder B with respect to the poles of the transmitter A B adjacent thereto. In accordance herewith the pointer S by this rotation of the rotor F of the main receiver at a time when the rotor P of the auxiliary receiver is at a standstill rotates through a fractional angle which corresponds to the fractional angle of rotation of the rotor F and then remains stationary again. The brush holder H of the auxiliary transmitter G H is now rotated. The rotation of the brush holder H causes a corresponding angular displacement of the field produced in the rotor F of the main receiver under the action of which this latter begins to rotate again. The rotation of the brush holder H is made to take place in such a direction that the pointer S approaches the zero mark $t^1$ by the shortest route and is to be continued until the pointer S eventually stands opposite the zero mark $t^1$. As soon as this is the case the main receiver F and with it the gun carriage has had imparted to it the position which corresponds exactly to the adjustment of the main transmitter. The brush holder H is also again exactly in the angular position which corresponds to the position of the brush holder B.

If the rotor F of the main receiver is to be switched in again, while the brush holder B for example is rotated, care must be taken before closing the switch $J^1$, that the brush holder H of the auxiliary transmitter G H is rotated with approximately the same angular velocity with which the rotation of the brush holder B takes place since otherwise no constant torque would arise in the rotor F on closing switch $J^1$. For this purpose the brush holder H is rotated in such a direction and with such velocity that two incandescent lamps U, $U^1$ bridging the interrupting points of the switch $J^1$ go out on synchronism being established. As soon as this is approximately the case, the switch $J^1$ is closed. At this instant a torque is again present in the rotor F of the main receiver E F and the rotor F runs with a velocity increasing with the difference of the speeds of rotation of the brush holders B and H of the main and auxiliary transmitters respectively. If therefore the brush holder H be stopped, the rotor F again synchronously follows all the adjustments prescribed by the brush holder B of the main transmitter and the pointer S, with the ratio of transmission of the gear $F^1$ M which serves for driving it selected as above given, remains stationary. There is however still a difference in space between the field of the rotor and the field of the stator of the receiver E F which is shown by the divergence of the pointer S from the mark $t^1$. In order to obviate this, the brush holder H of the auxiliary transmitter is again rotated until the pointer S eventually points to the mark $t^1$. As the rotation of the brush holder H causes a rotation of the field of the rotor F, relative to the rotor itself the speed of rotation of this latter temporarily alters, and the planet wheel R rotates with a speed corresponding to the difference of the speeds of rotation and to the ratio of the diameters of the toothed wheels $M^1$ and N about the shaft $n^1$ that is to say with a speed which is proportional to the speed of the brush holder H.

The construction of the invention shown in Figure 2 only differs from the apparatus just described by the fact that not the stator but the rotor F of the main receiver is electrically connected to the main transmitter A B by means of the conductors D and that the stator of the main receiver and the auxiliary transmitter are combined in one single device so that the stator winding $G^4$ forms also the winding of the auxiliary transmitter. This arrangement, which is particularly suitable for cases where the auxiliary transmitter may be located immediately near the object to be adjusted by the main receiver, has the advantage over the arrangement first described that, instead of a main receiver and a separate auxiliary transmitter there may be used one single device constructed in the way of an A. C. commutator motor.

It is obvious that no change takes place in the working of the apparatus first described by interchanging the stator E and the rotor F and by making integral the auxiliary transmitter and the stator of the main receiver.

Claims:

1. In an apparatus for transmitting rotary movements to a distance, the combination of a source of current, a transmitter connected to said source, a receiver having a stator member and a rotor member, electric connections between the transmitter and one of said members, electric connections with disconnecting means between the other of said members and the said source, a second similar receiver having a stator and a rotor, one of said members being in constant connection with said transmitter and the other member with said source and means for indicating the relative angular positions of said rotors.

2. In an apparatus for transmitting rotary movements to a distance, the combination of a source of current, a transmitter connected to said source, a receiver having a stator member and a rotor member, electric connections between the transmitter and one of said members, electric connections with disconnecting means between the other of said members and the said source, a second similar receiver having a stator and a rotor, one of said members being in constant connection with said transmitter and the other member with said source, and means for indicating the relative angular positions of said rotors, said means consisting of a sun and planet device, one element of said device being operatively connected to one of said rotors and the other element of said device being differentially connected to the other of said rotors.

3. In an apparatus for transmitting rotary movements to a distance, the combination of a source of current, a transmitter electrically connected to said source, a receiver with stator and rotor elements in constant electrical connection with said transmitter and said source, a second similar transmitter and receiver set in interruptible electrical connection with said first transmitter and said source whereby said second receiver may be actuated by either of said transmitters and means common to the rotors of said receivers for registering their relative angular movements.

4. In an apparatus for transmittting rotary movements to a distance the combination of a source of alternating current, a transmitter connected to said source, a receiver having a stator member and a rotor member, electric connections between the transmitter and one of said members, a second similar transmitter, electric connections between said other receiver member and the source including said second transmitter and disconnecting means, whereby the receiver may be controlled from either of said transmitters and on the interruption of said second connections the receiver will not follow the movements of the transmitters, a second receiver having a stator and a rotor, one of said members being connected to said first transmitter and the other member being connected to said source, and means controlled by both of said rotors for indicating the relative angular positions of said rotors.

5. In an apparatus for transmitting rotary movements to a distance the combination of a source of alternating current, a transmitter electrically connected to said source, a receiver in the form of an orienting motor having its field electrically connected to said transmitter and its armature excited from said source, a control means for the armature excitation of said orienting motor, said control means comprising a second transmitter electrically and variably connected on the one hand to said source and on the other hand to the armature of said orienting motor.

6. In an apparatus for transmitting rotary movements to a distance the combination of a source of alternating current, a transmitter connected to said source, a receiver having a stator member and a rotor member, electric connections between the transmitter and one of said members, a second similar transmitter, electric connections between said other receiver member and the source including said second transmitter and disconnecting means, whereby the receiver may be controlled from either of said transmitters and on the interruption of said second connections the receiver will not follow the movements of the transmitters, a second receiver having a stator connected to said first transmitter and a rotor connected to said source, and means controlled by both of said rotors for indicating the relative angular positions of said rotors, said means consisting of a sun and planet device, one element of said device being operatively connected to one of said rotors and the other element of said device being differentially connected to the other of said rotors.

The foregoing specification signed at Essen, Germany, this 27th day of May, 1920.

DR. RUD. FÖRSTER.

In presence of—
HANS GOTTSMANN,
JOSEF ALBERTZ.